(12) United States Patent
Xu et al.

(10) Patent No.: US 12,373,469 B2
(45) Date of Patent: Jul. 29, 2025

(54) SYNTHETIC GENERATION OF DATA WITH MANY TO MANY RELATIONSHIPS

(71) Applicant: SAS Institute Inc., Cary, NC (US)

(72) Inventors: Kai Xu, Sevenoaks (GB); Georgi Valentinov Ganev, Sevenoaks (GB); Emile Isak Joubert, Sevenoaks (GB); Rees Stephen Davison, Sevenoaks (GB); Olivier Rene Maurice Van Acker, Sevenoaks (GB); Luke Anthony William Robinson, Sevenoaks (GB); Sofiane Mahiou, Sevenoaks (GB)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/941,263

(22) Filed: Nov. 8, 2024

(65) Prior Publication Data

US 2025/0068658 A1 Feb. 27, 2025

Related U.S. Application Data

(63) Continuation of application No. PCT/GB2023/051318, filed on May 18, 2023.

(30) Foreign Application Priority Data

May 19, 2022 (GB) ..................... 2207384

(51) Int. Cl.
*G06F 16/28* (2019.01)
(52) U.S. Cl.
CPC ............... *G06F 16/288* (2019.01)

(58) Field of Classification Search
CPC .................................................. G06F 16/288
See application file for complete search history.

(56) References Cited

U.S. PATENT DOCUMENTS

| | | | |
|---|---|---|---|
| 2011/0041184 A1* | 2/2011 | Cormode | G06F 21/6254 707/E17.014 |
| 2013/0046797 A1* | 2/2013 | Muntz | G06Q 10/00 707/E17.044 |

(Continued)

FOREIGN PATENT DOCUMENTS

CN 114218602 3/2022

OTHER PUBLICATIONS

Patki, N. "The Synthetic Data Vault: Generative Modeling for Relational Databases. 2016." (Year: 2016).*

(Continued)

*Primary Examiner* — Mohsen Almani
(74) *Attorney, Agent, or Firm* — Bell & Manning, LLC

(57) ABSTRACT

Embodiments described herein relate to the efficient generation of synthetic datasets that represent many-to-many relationships. In particular, certain embodiments implement a particular factorization for many-to-many generative models, which leads to a scalable generation framework by combining random graph theory and representation learning. Further embodiments we extend the framework to establish the notion of differential privacy within the synthetically generated data. The embodiments described herein are therefore able to generate synthetic datasets efficiently while preserving information within and across many-to-many datasets with improved accuracy.

30 Claims, 4 Drawing Sheets

(56) References Cited

U.S. PATENT DOCUMENTS

| | | | | |
|---|---|---|---|---|
| 2014/0098101 | A1* | 4/2014 | Friedlander | G06T 11/206 |
| | | | | 345/440 |
| 2017/0293697 | A1* | 10/2017 | Youshi | G06F 16/84 |
| 2018/0307859 | A1* | 10/2018 | LaFever | H04L 63/20 |
| 2021/0012246 | A1* | 1/2021 | Hazard | G06N 7/01 |
| 2021/0374279 | A1 | 12/2021 | Xu et al. | |
| 2022/0238231 | A1* | 7/2022 | El Emam | G16H 50/20 |

OTHER PUBLICATIONS

Shen, Entong. "Privacy-preserving and Usable Data Publishing and Analysis." (2013). (Year: 2013).*

Choi E, Biswal S, Malin B, Duke J, Stewart WF, Sun J. Generating multi-label discrete patient records using generative adversarial networks. InMachine learning for healthcare conference Nov. 6, 2017 (pp. 286-305). PMLR. (Year: 2017).*

Wang, Zhenchen, Puja Myles, and Allan Tucker. "Generating and evaluating cross-sectional synthetic electronic healthcare data: Preserving data utility and patient privacy." Computational Intelligence 37.2 (2021): 819-851. (Year: 2021).*

Fernandes, Diogo André França. Synthetic data and re-identification risks. MS thesis. Universidade do Porto (Portugal), 2021. ( Year: 2021).*

Wang, Yue, and Xintao Wu. "Preserving differential privacy in degree-correlation based graph generation." Transactions on data privacy 6.2 (2013): 127. (Year: 2013).*

Brickell, Justin, and Vitaly Shmatikov. "Privacy-preserving classifier learning." Financial Cryptography and Data Security: 13th International Conference, FC 2009, Accra Beach, Barbados, Feb. 23-26, 2009. Revised Selected Papers 13. Springer Berlin Heidelberg, 2009. (Year: 2009).*

Feng Z, Mayer W, He K, Kwashie S, Stumptner M, Grossmann G, Peng R, Huang W. A Schema-Driven Synthetic Knowledge Graph Generation Approach With Extended Graph Differential Dependencies (GDD x s). IEEE Access. Dec. 30, 2020;9:5609-39. (Year: 2020).*

Ishak, Mouna Ben, Philippe Leray, and Nahla Ben Amor. "Random generation and population of probabilistic relational models and databases." 2014 IEEE 26th International Conference on Tools with Artificial Intelligence. IEEE, 2014. (Year: 2014).*

Houkjær, Kenneth, Kristian Torp, and Rico Wind. "Simple and realistic data generation." Proceedings of the 32nd international conference on Very large data bases. 2006. (Year: 2006).*

International Search Report and Written Opinion issued Nov. 23, 2023 for PCT application No. PCT/GB2023/051318 pp. 1-12.

Boroojeni, Asma Azizi, et al. "Generating bipartite networks with a prescribed joint degree distribution." Journal of complex networks 5.6 (2017): 839-857.

Xu, Lei, et al. "Modeling Tabular data using Conditional Gan", Arxiv.Org, Cornell University Library, 201 Olin Library Cornell University Ithaca, NY 14853,Oct. 28, 2019 (Oct. 28, 2019).

Yang, Carl, et al. "Secure Deep Graph Generation with Link Differential Privacy", Arxiv.Org, Cornell University Library, 201 Olin Library Cornell University Ithaca, NY 14853,May 1, 2021 (May 1, 2021).

Communication pursuant to Rules 161(1) and 162 EPC in EP Patent Application No. 23727645.6 dated Jan. 7, 2025, 3 pages.

Examination Report No. 1 in AU Patent Application No. 2023273273 dated May 27, 2025, 4 pages.

* cited by examiner

SYNTHETIC GENERATION OF DATA WITH MANY TO MANY RELATIONSHIPS

CROSS REFERENCE TO RELATED APPLICATIONS

This application is a continuation of International Application No. PCT/GB2023/051318, filed on May 18, 2023, which claims priority from GB Patent Application No. 2207384.5, filed on May 19, 2022, the contents of both of which are incorporated by reference herein in their entireties.

FIELD

Embodiments described herein relate to computer systems and computer implemented methods for generating synthetic data sets in a way that protects the relationships within the raw data while also protecting the privacy of the information within the raw data sets.

BACKGROUND

Advances in machine learning and data analytics have seen an increase in the value of raw data. With the value of raw data growing, it is becoming increasingly important that data security is maintained, not only for security but also to maintain privacy and comply with local regulations.

Some computing systems have strict Chinese walls to safeguard information and to comply with local regulations (e.g. within the banking industry or within healthcare). Consequently, many companies and research groups are unable to share raw, non-anonymous data due to the need to maintain user privacy. This can make data analysis across different data sources difficult. Furthermore, in some cases individuals' data may be protected under laws or regulations and the sharing of this data either between entities (e.g. between businesses) or across borders might be prohibited.

One approach to this problem is to create a synthetic data set based on the raw data set. A synthetic data set contains information that is artificially manufactured rather than generated by real-world events. In order to be of use, the synthetic data set should have similar statistical properties as the raw data set. However, the synthetic data set should be generated in a way that protects the privacy of the user data in the raw data set.

In a number of applications the raw data set is contained within a database having multiple tables. Various relationships can exist between the attributes of each table. The attributes can have one-to-one relationships, one-to-many relationships and/or many-to-many relationships.

SUMMARY

The present application provides an improved method of generating synthetic data that represents many-to-many relationships efficiently. This method can be adapted to ensure privacy, and in particular, differential privacy.

Previous approaches to generating synthetic data from raw data sources that contain many-to-many relationships have been found to lack scalability and/or lack applicability to a wide range of data sets. In particular, with previous approaches users have had to choose between neglecting the many-to-many relationships in the real data or sacrificing the level of privacy in the synthetic data. In light of this, a new approach to generating synthetic data from data sets containing many-to-many relationships is desired.

In particular, certain embodiments described herein apply a particular order to the generation of relationships and values when generating synthetic data with many-to-many relationships that is more computationally efficient. For instance, embodiments generate relationships (via the generation of edges between two tables) before the generation of values within the two related tables. This change reduces the complexity of the generation process, thereby making the generation scalable and the whole pipeline easier to implement in practice. Note that this change is not simple as it requires the use of very different techniques to those previously implemented, including random graph generation from graph theory and graph/node representation from the representation learning literature. In practice, the change results in synthetic data with many to many relationships being generated up to 10× more quickly that previous methods. Furthermore, the methods described herein are able to be implemented whilst maintaining control of fidelity and privacy.

According to a first aspect there is provided a computer-implemented method for generating a synthetic data set from a first data set, wherein: the first data set comprises a first table (Table A) comprising a first plurality of entries and a second table (Table B) comprising a second plurality of entries; the synthetic data set comprises a third table (Table A') comprising a third plurality of entries and a fourth table (Table B') comprising a fourth plurality of entries. The method comprises generating a synthetic graph based on a plurality of associations between the first plurality of entries in the first table (Table A) and the second plurality of entries in the second table (Table B), wherein the synthetic graph comprises a first set of nodes (U'), a second set of nodes (V') and a first set of edges (L'); determining one or more attributes associated with each node in the first set of nodes (U') using a first conditional model (p(U|L)) conditioned on the synthetic graph; and determining one or more attributes associated with each node in the second set of nodes (V') using a second conditional model (p(V|L, U)) conditioned on the synthetic graph and on the one or more attributes associated with each node in the first set of nodes (U'); wherein: the third plurality of entries correspond to the one or more attributes associated with each node in the first set of nodes (U'), and the fourth plurality of entries correspond to one or more attributes associated with each node in the second set of nodes (V'). In an embodiment conditioned on the synthetic graph and on the one or more attributes associated with each node in the first set of nodes (U') may be conditioned on all of the attributes associated with the first set of nodes, or at least some of the attributes.

In an embodiment generating the synthetic graph based on the plurality of associations between entries in the first table (Table A) and entries in the second table (Table B) comprises: generating the first set of edges (L') such that the first set of edges (L') has a same joint distribution of pairs of node degrees as a second set of edges in a second graph representing the first data set.

In an embodiment generating the synthetic graph based on the plurality of associations between entries in the first table (Table A) and entries in the second table (Table B) comprises: obtaining a bipartite joint degree distribution ($P_J$), wherein the bipartite joint degree distribution ($P_J$) represents the plurality of associations between entries in the first table (Table A) and entries in the second table (Table B); modifying the bipartite joint degree distribution ($P_J$) to generate a modified bipartite joint degree distribution ($P_J$+noise); sampling a target number of edges from the modified bipartite joint degree distribution ($P_J$+noise) to generate a joint degree matrix for the synthetic data; and generating the synthetic graph that complies with the joint degree matrix for the synthetic data.

In an embodiment the Bipartite joint degree distribution is a joint degree matrix that gives the number of edges between vertices of degree i and degree j for every pair (i,j).

In an embodiment generating the synthetic graph that complies with the joint degree matrix for the synthetic data includes generating a synthetic graph having a same joint degree distribution as represented by the joint degree matrix for the synthetic data.

In an embodiment generating the synthetic graph based on the joint degree matrix comprises using a 2-k generator.

In an embodiment obtaining the bipartite joint degree distribution ($P_J$) comprises: representing the plurality of associations between entries in the first table (Table A) and entries in the second table (Table B) as a bipartite graph (B); and calculating the bipartite joint degree distribution ($P_J$) of the bipartite graph (B).

In an embodiment generating the synthetic graph that complies with the joint degree matrix comprises: generating a bipartite graph having a joint degree distribution that complies with the joint degree matrix for the synthetic data; and altering edges within the bipartite graph to remove loop edges and/or to remove multiple edges whilst maintaining a joint degree distribution that complies with the joint degree matrix for the synthetic data.

In an embodiment the bipartite graph is generated based on random pairings.

In an embodiment modifying the bipartite joint degree distribution ($P_J$) to generate the modified bipartite joint degree distribution ($P_J$+noise) comprises: injecting additive noise to the bipartite joint degree distribution ($P_J$).

In an embodiment the bipartite joint degree distribution ($P_J$) is a matrix and wherein injecting the additive noise to the bipartite joint degree distribution ($P_J$) further comprises: calculating a noise value for an entry in the matrix using a Laplace mechanism to ensure $\varepsilon$-differential privacy, where $\varepsilon$ is a first parameter associated with an amount of differential privacy ($\varepsilon$); and adding the noise value to the entry.

In an embodiment calculating a noise value using a Laplace mechanism comprises: modelling a probability of the noise value's value as a Laplace distribution; and sampling from the Laplace distribution to determine a value of the noise value.

In an embodiment the noise value is calculated according to:

$$\text{Lap}\left(\frac{S_{ij}}{\varepsilon}\right),$$

where $S_{ij}=4 \max(d_i, d_j)$, where i is the row of the entry in the matrix, j is the column of the entry in the matrix, ($d_i$, $d_j$) is a position of the entry in the matrix and Lap is the Laplace mechanism.

In an embodiment determining one or more attributes associated with each node in the first set of nodes (U') using the first conditional model (p(U|L)) conditioned on the synthetic graph comprises: determining a node embedding for each node in the first set of nodes (U') based on a first node embedding model ($\beta$) and the synthetic graph; and determining the one or more attributes associated with each node in the first set of nodes (U') using the first conditional model ((p(U|L)) and the node embedding for each node in the first set of nodes (U').

In an embodiment determining the one or more attributes associated with each node in the first set of nodes (U') using the first conditional model ((p(U|L)) and the node embedding for each node in the first set of nodes (U') comprises inputting each node embedding into the first conditional model.

In an embodiment determining a node embedding for each node in the first set of nodes (U') based on the first node embedding model ($\beta$) and the synthetic graph comprises: obtaining the first node embedding model ($\beta$), wherein the first node embedding model ($\beta$) is configured to represent a node of a graph as a vector; and determining the node embedding for each node in the first set of nodes (U') using the first embedding model ($\beta$) and synthetic graph.

In an embodiment the first node embedding model ($\beta$) is based on one of: a) the number of neighbors in the synthetic graph within a given distance d from a node being embedded; b) a DeepWalk model; or c) a node2vec model. In an embodiment, the node embedding model ($\beta$) may be an embedding neural network trained to generate an embedding of a node of a graph.

In an embodiment determining the one or more attributes associated with each node in the first set of nodes (U') using the first conditional model (p(U|L)) conditioned on the synthetic graph comprises: obtaining the first conditional model ((p(U|L)); and determining a probability distribution of each attribute associated with a node in the first set of nodes (U') using the first conditional model ((p(U|L))) and a node embedding associated with the node; and sampling from the probability distribution to obtain each attribute associated with the node.

In an embodiment obtaining the first conditional model (p(U|L)) comprises: extracting a first set of attributes from the first table (Table A); representing the plurality of associations between entries in the first table (Table A) and entries in the second table (Table B) as a second bipartite graph (B), wherein: the second graph comprises a third set of nodes (U) associated with the first set of attributes and a second set of edges (L); determining a third set of node embeddings comprising a node embedding for each node in the third set of nodes; and generating the first conditional model (p(U|L)) based on the first set of attributes and the third set of node embeddings.

In an embodiment generating the first conditional model (p(U|L)) based on the first set of attributes and the third set of node embeddings, comprises: fitting the first conditional model on the first set of attributes with the third set of node embeddings as a condition.

In an embodiment fitting includes training, i.e. adjusting the parameters of the conditional model to optimize an objective function. The training may include stochastic gradient descent. The gradient descent may be subject to a condition ensuring differential privacy. The condition may specify $\epsilon$-differential privacy.

In an embodiment determining one or more attributes associated with each node in the second set of nodes (V') using a second conditional model (p(V|L, U)) conditioned on the synthetic graph and the one or more attributes associated with each node in the first set of nodes (U'), comprises: determining a second node embedding for each node in the second set of nodes (V') based on a second node embedding model ($\gamma$) and information associated with neighbors (ne($n_v$)) of each node in the second set of nodes (V'); determining the one or more attributes associated with each node in the second set of nodes (V') using a second conditional model (p(V|L, U)) and the second node embedding for each node in the second set of nodes (V').

In an embodiment determining the second node embedding for each node in the second set of nodes (V') based on the second node embedding model (γ) and neighbors (ne($n_v$)) of each node in the second set of nodes (V'), comprises: obtaining the second node embedding model (γ), wherein the second node embedding model (γ) is configured to represent a node of a graph as a vector; determining the second node embedding for each node in the second set of nodes using the second embedding model (γ) and information associated with the neighbors (ne($n_v$)) of each node in the second set of nodes (V'), wherein: the information associated with neighbors (ne($n_v$)) of each node in the second set of nodes (V'), comprises the one or more attributes associated with each node in the first set of nodes (U') that are associated with the neighbors (ne($n_v$)) of each respective node in the second set of nodes (V').

In an embodiment determining a second node embedding for a third node in the second set of nodes (V') comprises: determining a third set of nodes (ne($n_v$)) in the first set of nodes (U') that are neighbours of the third node, and determining the second node embedding for the third node based on the one or more attributes associated with each node in the third set of nodes (ne($n_v$)).

In an embodiment determining the second node embedding for each node in the second set of nodes using the second embedding model (γ) and information associated with the neighbors (ne($n_v$)) of each node in the second set of nodes (V'), comprises determining an aggregation of the one or more attributes of the neighbors (ne($n_v$)) of each node in the second set of nodes (V').

In an embodiment the aggregation is the node embedding.

In an embodiment the neighbors of a node in the second set of nodes are "parents" of the node, these parents are nodes in the first set of nodes that are (directly) linked/connected to the respective node in the second set of nodes.

In an embodiment the second node embedding for each node in the second set of nodes is a fixed size vector.

In an embodiment the second node embedding model (γ) is an aggregator based on one of: a) summary statistics including one or more of: count, sum, n-th order moments, or the q-percent quantiles for a chosen set of q that spans [0, 1]; b) a DP Copula model; or c) a deep set model.

In an embodiment determining the one or more attributes associated with each node in the second set of nodes (V') using a second conditional model (p(V|L, U)) and the second node embedding for each node in the second set of nodes (V'), comprises: obtaining the second conditional model (p(V|L, U)); determining a second probability distribution of each attribute associated with a node in the second set of nodes (V') using the second conditional model (p(V|L, U)) and a second node embedding associated with the node; and sampling from the second probability distribution to obtain each attribute associated with the node.

In an embodiment obtaining the second conditional model (p(V|L, U)) comprises: extracting a second set of attributes from the second table (Table B); representing the plurality of associations between entries in the first table (Table A) and entries in the second table (Table B) as a third bipartite graph (B), wherein: the third bipartite graph comprises a fourth set of nodes (V) associated with the second set of attributes; determining a fourth set of node embeddings comprising a node embedding for each node in the fourth set of nodes (V), wherein the node embedding for each node in the fourth set of nodes (V) represents attributes of neighbours of each node in the fourth set of nodes (V); and generating the second conditional model (p(V|L, U)) based on the second set of attributes and the fourth set of node embeddings.

In an embodiment the neighbours are parents of the node.

In an embodiment determining the fourth set of node embeddings, further comprises: determining a multiset representation for each node in the fourth set of nodes (V) based on the attributes of the neighbours of each respective node in the fourth set of nodes (V); and calculating the fourth set of node embeddings based on the multiset representation for each node.

In an embodiment generating the second conditional model (p(V|L, U)) based on the second set of attributes and the fourth set of node embeddings, comprises: fitting the second conditional model on the second set of attributes with the fourth set of node embeddings as a condition.

In an embodiment fitting includes training, i.e. adjusting the parameters of the conditional model to optimize an objective function. The training may include stochastic gradient descent subject to a condition ensuring differential privacy. The condition may specify ε-differential privacy.

In an embodiment the first conditional model and the second conditional model are each Differentially Private (DP) conditional models.

In an embodiment generating the synthetic graph comprises generating the synthetic graph based on a first learnable parameter ($θ_1$), and the method further comprises determining a value of the first learnable parameter ($θ_1$).

In an embodiment the first learnable parameter effects the mapping of edges in a graph associated with the first data set to the bipartite joint degree distribution ($P_J$).

In an embodiment the method further comprises: learning a value of a second learnable parameter ($θ_2$), such that the first conditional model (p(U|L)) satisfies a criteria, wherein: the second learnable parameter ($θ_2$) comprises parameters of the first conditional model (p(U|L)); and the criteria is that an error between an output of the first conditional model p(U|L) and a node value associated with the first data set is minimized subject to a differential privacy criteria.

In an embodiment the second learnable parameter ($θ_2$) further comprises a third set of parameters associated with the first node embedding model (β).

In an embodiment the method further comprises: learning a value of a third learnable parameter ($θ_3$), such that the second conditional model (p(V|L, U)) satisfies a criteria, wherein: the second learnable parameter ($θ_3$) comprises parameters of the second conditional model (p(V|L, U)); and the criteria is that an error between an output of the second conditional model (p(V|L, U)) and a node value associated with the first data set is minimized subject to a differential privacy criteria.

In an embodiment the third learnable parameter ($θ_3$) further comprises a fourth set of parameters associated with the second node embedding model (γ).

In an embodiment a conditional model comprises a conditional generative model.

In an embodiment attributes of the first table and second table are associated by a many-to-many relationship.

In an embodiment the synthetic graph models relationships in the synthetic data set.

In an embodiment the first data set comprises real data generated by a human.

According to a second aspect there is provided a computer implemented method for generating a synthetic data set from a first dataset wherein the first data set comprises a plurality of tables, and the method further comprises: generating synthetic data for each combination of tables in the plurality of tables in the first data set according to the method of any preceding claim.

According to a third aspect there is provided a non-transitory computer-readable medium comprising computer program instructions suitable for execution by a processor, the instructions configured, when executed by the processor, to perform the methods described above.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

In synthetic data generation (SDG), a generative model is fitted on raw data, and samples are drawn from the model to generate synthetic data. The synthetic data can then be released as protected synthetic data, mirroring relationships within the raw data but also protecting privacy within the raw data. While real-world datasets usually consist of multiple tables with potential many-to-many relationships (i.e. many-to-many datasets), some SDG methods focus on modelling tables independently. Other methods only consider generating datasets with special cases of many-to-many relationships such as one-to-many.

Embodiments described herein relate to the efficient generation of synthetic datasets that represent many-to-many relationships. In particular, certain embodiments implement a particular factorization for many-to-many generative models, which leads to a scalable generation framework by combining random graph theory and representation learning. Further embodiments extend the framework to establish the notion of differential privacy within the synthetically generated data. The embodiments described herein are therefore able to generate synthetic datasets efficiently while preserving information within and across many-to-many datasets with improved accuracy.

Figure 1:
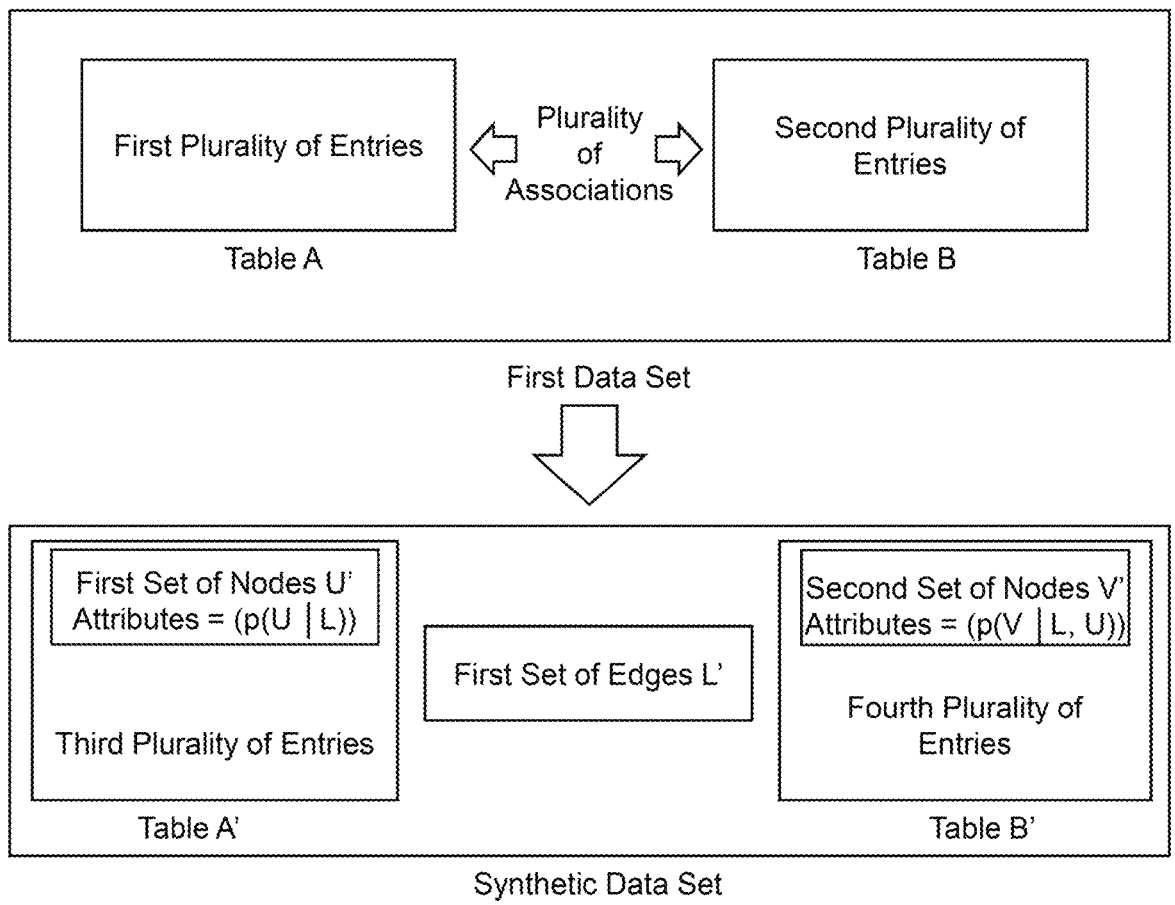
FIG. 1 shows a method for generating a synthetic data set from a first data set.

FIG. 1 shows a method for generating a synthetic data set from a first data set.

A first data set includes a first plurality of entries (Table A) and a second plurality of entries (Table B). The first plurality of entries (Table A) and the second plurality of entries (Table B) have a plurality of associations between them.

In an example the first data set is a real data set (e.g. a data set containing "real" data, which is observed rather than being generated algorithmically). The first data set may be called a raw data set. The terms "real" and "raw" in this context may mean that it is not synthetic data (e.g. it is real-world data). The real or raw data may have had previous operations or calculations performed on it and may be the result of previous operations or calculations (for instance, filtering). The first data set may be stored in memory or may be received (e.g. from an external source such as via a network).

There are various use-cases for the methods of generating a synthetic data set described herein.

In a first use-case the first data set comprises customer banking data including, but not limited to: customer location, customer age, and/or customer financial information (including account balance). Using customer banking data for training machine learning models can be challenging due to the need to protect the privacy of the user's data as well as the need to comply with the various regulatory requirements. Applying the methods described herein enables a synthetic data set to be generated that is statistically similar to the first data set (e.g. includes the same or similar attributes, relationships or correlations between data in the first data set), but protects the privacy of the customer. Furthermore, applying the methods described herein enables the many-to-many relationships within the first data set to be captured in the synthetic data set.

Advantageously, customers like banks and consulting companies need exact Synthetic Data Sets in order to move their data around (either internally between different branches or sharing it with external partners) safely and rapidly.

In a second use-case the first data set comprises customer order information including, but not limited to: information identifying an item ordered and information identifying a supplier of the order. Applying the methods described herein enables a synthetic data set to be generated that is statistically similar to the first data set, but protects the privacy of the data set. Without care, relationships in real data can also reveal private information. As a simple example, in a customer-merchant dataset, the number of links to a merchant could reveal its identity because of its uncommon popularity. Accordingly, whilst it may be possible to generate synthetic data to allow further analysis (e.g. training of further machine learning models), preserving relationships too accurately within synthetic data can lead to private data being leaked. It is therefore important that this process is made differentially private in order to avoid the leaking of private information. Furthermore, applying the methods described herein enables the many-to-many relationships within the first data set to be captured in the synthetic data set.

In a third use-case the first data set contains manufacturing data including, but not limited to, sensor readings obtained by measuring a physical object and/or process. Applying the methods described herein enables a synthetic data set to be generated that can be shared with third-party organizations for the purpose of analysis and process improvement. Furthermore, applying the methods described herein enables the many-to-many relationships within the first data set to be captured in the synthetic data set.

In a fourth use-case the first data set contains personal medical information including, but not limited to, patient number, patient age, medical conditions, and/or patient test/measurement results. Applying the methods described herein enables a synthetic data set to be generated that can be shared with third-parties for the purpose of analyzing trends in the medical information and for identifying treatments for the patient, while also preserving the privacy of the patient. Furthermore, applying the methods described herein enables the many-to-many relationships within the first data set to be captured in the synthetic data set.

It will be appreciated that the methods described herein could be applied to other use cases.

With the techniques described herein, customers have a way to release sensitive data with many-to-many relationships in a private manner without having to give up on many-to-many relationships or risk themselves leaking private information.

In an example a database stores the first data set (e.g. a real data set containing values obtained by direct measurement). The database represents the first data set as a plurality of tables. A table is a data structure that organizes data into columns and rows. Each row in the table is associated with a record and has a unique row index. Each column in the table is associated with a data field and each column is often associated with a label (e.g. "First Name", "Last Name" etc.).

An example database storing a raw data set in two tables is shown below:

TABLE A

| Order Number | Customer ID |
|---|---|
| 1 | A |
| 2 | B |
| 3 | C |
| 4 | A |
| 5 | C |

TABLE B

| Order Number | Item Ordered |
|---|---|
| 1 | Car |
| 2 | Book |
| 3 | Table |
| 4 | Book |
| 5 | Car |

In this example: the rows of table A are: {1, A}, {2, B}, {3, C}, {4, A}, {5, C}. The rows of table B are: {1, Car}, {2, Book}, {3, Table}, {4, Book}, {5, Car}.

The entries (or records) in Table A are associated with the entries (or records) in Table B by a column of the tables (for example the "Order Number" field). The links (or the "associations") between Table A and Table B are: {A, Car}, {B, Book}, {C, Table}, {A, Book}, {C, Car}. As can be seen from Table A, the Order Number field is a unique identifier in the sense that no orders share the same order number. However, the Customer ID is not unique since two separate orders can be made by the same customer (e.g. orders 1 and 4 are both made by customer 'A').

Each row of the table is associated with attributes. The attributes associated with a row of the table are the values of the data fields/columns. For example, the attribute associated with a first row of Table A is: {A}. The attributes do not include the index used to uniquely identify each row in the table or the field that is used to generate the links between the tables (which in the example above is the "Order Number" field). In an example where the table comprises more than one data field/column then the attributes associated with each row take the form of a D-dimension matrix, where D is the number of data fields associated with each row/index in the table.

The attributes from a pair of tables can be represented by: a one-to-one relationship, a one-to-many relationship, a many-to-one relationship, or a many-to-many relationship. In a one-to-one relationship an attribute in a first table is associated with one, and only one, attribute in another table. In a one-to-many relationship one attribute in a first table is associated with a plurality of attributes in a second table, but each attribute in the plurality of attributes in the second table is uniquely associated with that one attribute in the first table. In a many-to-many relationship a plurality of attributes in the first table are associated with a plurality of attributes in the second table.

In the example shown above there is a many-to-many relationship between the "customer ID" field and the item ordered because a single customer ID can order different items (e.g. Customer ID 'A' orders a "Car" and a "Book"), while a single item can be ordered by different customers (e.g. the 'Car' is ordered by customer 'A' and 'C').

As shown in FIG. 1, a synthetic data set can be generated that had a distribution that matches the distribution of the first data set (e.g. that shares some of the properties of the first data set). The synthetic data set can include a third plurality of entries (Table A'), a fourth plurality of entries (Table B') and a first set of edges L'.

In the embodiments described herein graphs are used to represent the data sets. A graph is a mathematical structure that is used to model the relationship between objects. A graph comprises nodes and edges connecting the nodes. In the examples discussed herein, reference is made to a synthetic graph. A synthetic graph is a graph that models the synthetic data set. Accordingly, the synthetic data set may be represented by a synthetic graph in which each entry is a node and in which relationships between the third plurality of entries (Table A') and the fourth plurality of entries (Table B') are represented by edges.

Certain embodiments described herein make use of a bipartite graph. A bipartite graph is graph whose vertices (i.e. nodes) can be divided into two disjoint and independent sets; U and V, such that every edge connects a vertex in set U to a vertex in set V.

Accordingly, as shown in FIG. 1, the third plurality of entries (Table A') can be a first set of nodes U' and the fourth plurality of entries (Table B') can be represented by a second set of nodes V'. The first set of edges L' can connect the first set of nodes U' to the second set of nodes V', such that an edge connects a vertex in set U' to a vertex in set V'.

In the following description reference is made to a neighbor or neighbors of a node in a set of nodes. It will be appreciated that in a bipartite graph the neighbor of a node in a set of nodes (e.g. in V') are the nodes in the other set (i.e. in U') that are connected to that node by an edge. These neighbor nodes may also be referred to as the "parents" or "parent nodes", of the node in V' (which is the "child node").

In the embodiments described herein reference is made to a node embedding. Node embeddings are a way of representing nodes of a graph as a vector. A node embedding model includes a process that transforms (or maps) information associated with a node of the graph into a vector identifying the node.

In the examples described herein reference is made to a conditional model (also referred to as a conditional generative model or a conditional probability model). A conditional model is a model that predicts the probability of an event occurring, given another event has occurred.

In some examples, the method uses a plurality of differentially private conditional models.

In an example, the methods may be configured to generate data according to a given level of privacy. This adjusts the resolution of the data output and can be affected by the amount of randomness introduced when generating the synthetic data. Differential privacy provides a robust, mathematically provable guarantee of privacy protection. In the context of differential privacy, a process or function is private if the removal of an individual user's data from the input data set does not result in more than a predefined amount of privacy loss.

In an example, the methods are used to establish (ε, δ)-differential privacy a.k.a. (ε, δ)-DP or approximate DP. A conditional model, $p_\theta$, with synthesis algorithm, A, (where $A=A_1 \circ A_2$, $A_2$ is the sampling process, $A_1$ is the learning algorithm) is (ε, δ)-DP if:

for all $\mathcal{S} \subseteq \text{Range}(\mathcal{A})$ and for all B, B' that differ on a single element:

$$\mathbb{P}(\mathcal{A}(\mathcal{B}) \in \mathcal{S}) \leq \exp(\epsilon)\mathbb{P}(\mathcal{A}(\mathcal{B}') \in \mathcal{S}) + \delta.$$

In the examples described herein, fitting the probabilistic models includes training the probabilistic models.

A distinction of the approach described herein compared to previous approaches is that with previous approaches the order of generation of table rows and links: certain examples described herein first generate random, synthetic links that share the same joint degree distribution as the real data unconditionally by sampling target bipartite joint degree matrices that are fed to a 2K-generator and then condition on the links by graph/node embeddings to generate rows. In contrast, alternative methods implement these steps in the reverse order. Note that this change is not simple as it requires the use of very different techniques, including random graph generation from graph theory and graph/node representation from the representation learning literature. This change makes the generation scalable and the whole pipeline easy to implement in practice. For the customer, they are able to quickly generate 10× data while controlling the fidelity and privacy; for the manufacturer of the software, the code is easy to maintain because of this easy-to-implement design.

Factorisation

To simplify the discussion, we first focus on modelling bipartite graph and will later extend it to multipartite graphs. For the joint distribution p(U,V,L), where U,V are two tables with rows linked by edges in L, that we are interested in, considering the fact that the roles of U and V are exchangeable, there are three possible factorization of the joint p(U,V,L) $p_{joint}$:

| | |
|---|---|
| $p_{joint,S} = p(U)p(L \mid U)p(V \mid U, L)$ | Factorization S |
| $p_{joint,E} = p(U)p(V \mid U)p(L \mid U, V)$ | Factorization E |
| $p_{joint,A} = p(L)p(U \mid L)p(V \mid U, L)$ | Factorization A |

Embodiments described herein make use of Factorization A in order to more efficiently model multiple dependencies.

Within all factorization, there are 6 sub-models in total to consider:

p (U) (the single-table model) can be any generative model for single table generation. This model generates a table U.

p(L|U) (the semi-conditional edge model) generates edges L based on a table U.

p(V|U, L) (the conditional table model) generates each node in a second table V based on a first table U and edges L. The model may generate each node in V to be connected to a respective subset of nodes in U via L.

p(V|U) (the table-conditional model) generates a second table V conditioned on a first table U. This model can be computationally challenging to implement. Whilst it is possible to implement this by modelling the two-table joint p(U,V) directly and applying a generative model on the joint table, this can lead to a table with an intractable scale, and it can be difficult to reverse the join operation from the synthetic data to recover individual tables.

p(L|U, V) (the edge prediction model) predicts the existence of edges between node pairs from two tables, U and V.

p(L) (the edge model) generates edges unconditionally. This form of random graph model is studied in random graph theory.

p(U|L) (the edge-conditional model) generates a table U given a set of edges L. This may be achieved using a node embedding.

Factorization S and E have a number of disadvantages. For instance, for Factorization S there is no simple method for extending p(L|U) to a general many-to-many case. Factorization E suffers from a scalability issue with p(V|U) (or similarly p(U,V)) as noted above.

In light of the above, embodiments described herein implement Factorization A, which provides an efficient means of modelling many-to-many relationships for synthetic data generation.

Figure 2:
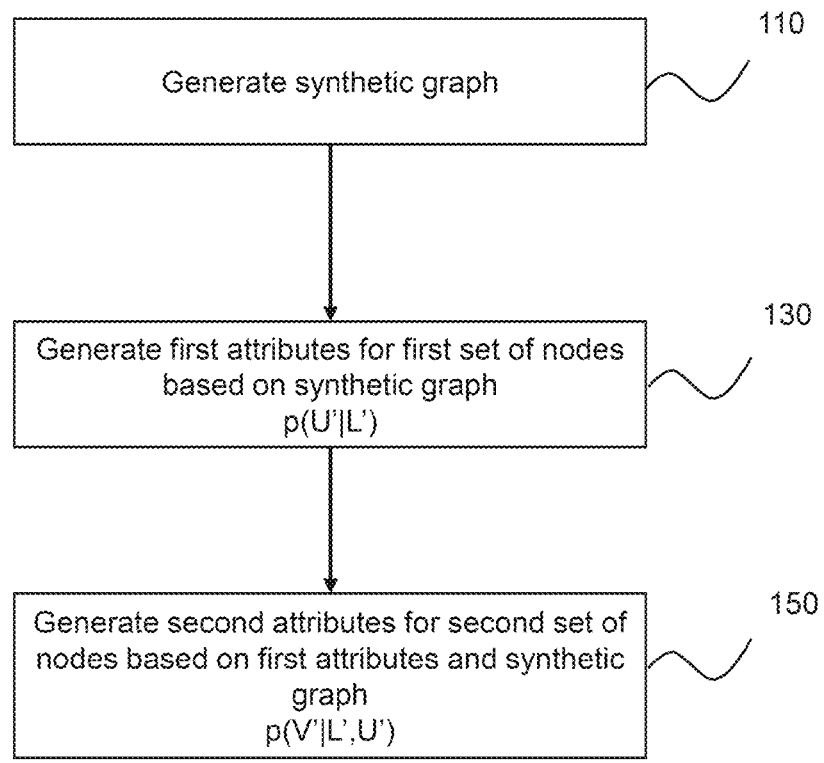
FIG. 2 shows a method for generating synthetic data according to an embodiment.

FIG. 2 shows a method 100 for generating synthetic data according to an embodiment. Firstly, a synthetic graph is generated 110 based on associations between the entries in the first table A and the second table B. The graph includes a first set of nodes U', a second set of nodes V' and a first set of edges L'. Then, one or more attributes are determined 130 for each node in the first set of nodes U' using a first conditional model p(U'|L') conditioned on the synthetic graph. Then, one or more attributes are determined 150 for each node in the second set of nodes V' using a second conditional model p (V'|L', U') conditioned on the synthetic graph and on the one or more attributes associated with each node in the first set of nodes.

The method 100 may be repeated for each pair of tables in the dataset to synthesize. The three steps within the method 100 shall be described in more detail below.

Stage 1 (Step 110)

During the first stage, a graph is generated based on a pair of tables A, B being modelled (from the real-world/raw data). The graph includes nodes for a first synthesized table A', nodes for a second synthesised table B' and edges L' connecting the two sets of nodes. At this stage, only the graph topology is being generated, so no attributes are associated with each node. Pseudocode for generating a synthetic graph is detailed in Algorithm 1, below. Algorithm 1 is a corrected version of the bipartite 2K generator detailed in Asma Azizi Boroojeni, Jeremy Dewar, TongWu, and James M Hyman, "Generating bipartite networks with a prescribed joint degree distribution", *Journal of complex networks*, 5(6):839-857, 2017, the entirety of which is hereby incorporated by reference.

In order to generate the synthetic graph, embodiments obtain a bipartite joint degree distribution of the input data and generate a random graph satisfying this distribution.

Figure 3:
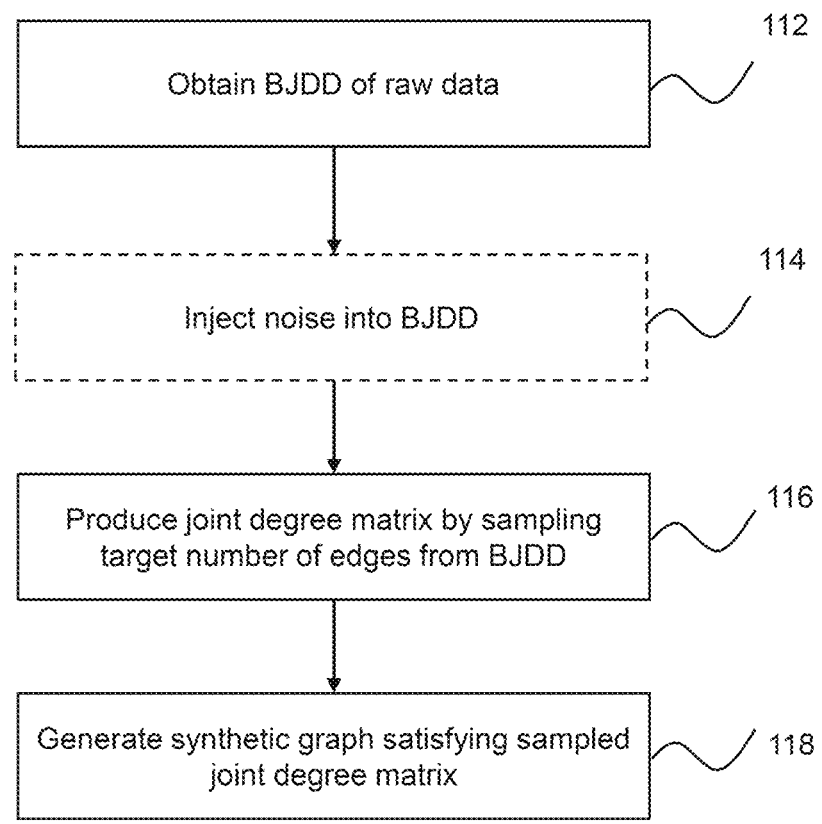
FIG. 3 shows a method for generating a synthetic graph for a pair of tables within an input data set.

FIG. 3 shows a method for generating a synthetic graph for a pair of tables within an input data set. This method may be repeated for each pair of tables.

Firstly, a bipartite joint degree distribution J of the input data is obtained 112. This may be obtained by extracting the links between rows of the tables, representing the links as a bipartite graph and computing the bipartite joint degree distribution (BJDD) of the graph.

If the synthetic data is to be anonymized, noise may be injected into the BJDD 114. For instance, additive noise may be injected into the distribution (e.g. using a Laplace mechanism). The noise added to each entry may be conditioned on the maximum of the row and column marginal distributions.

A target number of edges are then sampled from the joint degree distribution 116 based on the size of the desired dataset to produce a joint degree matrix.

Then a synthetic graph is generated that satisfies the sampled joint degree matrix 118. A target number of edges may be sampled from the bipartite joint degree distribution (PJ). This may comprise taking n edges from Pj where n is a target number (e.g. defined by the user or based on the size of the desired dataset (i.e. the size of the synthetic data set)). In an example the sampling is random sampling.

The synthetic graph can be generated using a dK-generator method to model the probability of edges p(L'). Specifically, a 2 k-distribution may be used. This involves a dK-distribution, where d=2. In this methodology, d represents the size of a graph being modelled. dK-graphs are the sets of graphs constrained by given values of dK-distributions. Producing a family of 0K-graphs for a given input graph requires reproducing only the average node degree of the original graph. Producing a family of 1K-graphs requires reproducing the original graph's node degree distribution, the 1K-distribution. 2K-graphs reproduce the joint degree distribution, the 2K-distribution, of the original graph. This is the probability that a randomly selected link connects nodes of degrees k and k defined as the (joint) degree distribution of all pairs of d nodes in the graph.

All graphs with a given dK-distribution are called dK-graphs. For example, 0K-graphs share the same graph density, 1K-graphs share the same distribution of node degrees, 2K-graphs share the same joint distributions of degrees of node pairs, etc. Models that sample dK-graphs are called dK-generators. The present methodology applies the same notion for bipartite graphs, defining bipartite dK-graphs, and learning a distribution $p_\theta$ that generates bipartite 2K-graphs of input data.

For a bipartite graph B, its bipartite joint degree distribution (BJDD) is defined as the empirical distribution of samples $\{(\deg(n(i_u^k)), \deg(n(i_v^k)))\}_{k=1}^{|L|}$ where n(i) denotes the node k=1 with index i (similarly i(n) is the node index for node n) and deg(n) is the degree of the node n. Such an empirical distribution can be represented as a matrix $P_J$ along with the supports $d_u$, $d_v$ for both dimensions. The (marginal) degree distributions of the upper or lower nodes can also be calculated from the BJDD. For example, that of upper nodes $p_u$ is a probability vector (a vector of whose elements sum up to 1) in which its i-th element $p_u[i]=\Sigma_j P_J[i, j]/d_u[i]$.

The synthetic graph can be generated based on an iterative process. First a bipartite graph can be generated based on a random pairing to match the desired joint distribution. This step involves first creatin stubs for each node based on its degree; the stubs for a node with index i and degree d is a list $$[\underbrace{i, \ldots, i}_{d}].$$

After stubs for all nodes are created, they are randomly paired based on the joint degree distribution (to match the required joint degree distribution). This can be achieved by enumerating the joint degree count. At each iteration for a pair of degree $d_1$, $d_2$, $d_1$ stubs can be randomly sampled with degree $d_1$ and $d_2$ stubs can be randomly sampled with degree $d_2$. These stubs can be paired accordingly. After this, the graph matches the distribution but has potentially repeated edges.

Then, a rewiring process can be performed to make the graph simple while preserving the joint degree distribution. A graph is called simple if there is no loops or multiple edges.

For given datasets with multiple tables, the methodology described herein can be repeated to generate edges for each pair of tables. An arbitrary order can be applied to the generation of each pair of tables. The edges for each pair of tables can be generated according to this order.

When generating graphs involving tables with more than one connection, there is a risk that an infinite loop may be implemented during the rewiring process. To avoid this, the method may terminate after a predefined maximum number of iterations.

The learning of the model for generating synthetic graphs only involves computing the BJDD matrix from the data graph. If a table is involved in multiple edges, the joint distribution of all degrees per node is learned. Sampling from the model is defined by sampling from $P_1$ followed by Algorithm 1.

| Algorithm 1 Bipartite 2K-generator (Boroojeni et al., 2017, corrected) |
| --- |
| 1:    Input: BJD J with supports $d_u$, $d_v$ |
| 2:    Output: Edges $\mathbb{L}$ |
| 3:    Initialize $\mathbb{L} = \emptyset$            ▷ Initialise edges as empty set |
| 4:    # Part 1: random pairing |
| 5:    $s_u \leftarrow [\ ], s_v \leftarrow [\ ]$            ▷ Initialise stubs as empty lists |
| 6:    Compute degree sequences u, v from J |
| 7:    for $i_u \in 1, \ldots, |u|, k \in 1, \ldots, u[i_u]$ do |
| 8:        Append $i_u$ to $s_u$ |
| 9:    end for |
| 10:   for $i_v \in 1, \ldots, |v|, k \in 1, \ldots, v[i_u]$ do |
| 11:       Append $i_u$ to $s_u$ |
| 12:   end for |
| 13:   for $i \in 1, \ldots, |d_u| \ j \in 1, \ldots, |d_v|$ do |
| 14:       $k \leftarrow J[i, j]$ |
| 15:       Randomly pop k node indices $\{i_u^l\}_{l=1}^k$ from $s_u$ s.t. the corresponding nodes $n(i_u^l)$ has degree $d_u[i]$ |
| 16:       Randomly pop k node indices $\{i_v^l\}_{l=1}^k$ from $s_v$ s.t. the corresponding nodes $n(i_v^l)$ has degree $d_u[j]$ |

-continued

Algorithm 1 Bipartite 2K-generator (Boroojeni et al., 2017, corrected)

```
17:        Add edges {(i_u^l, i_v^l)}_{l=1}^k to 𝕃
18:     end for
19:     # Part 2: rewiring process (corrected version)
20:     𝕃_r ← repeated edges in 𝕃          ▷ Repeated edges to resolve
21:     while 𝕃_r is not empty do
22:        Randomly pop edge (i_u, i_v) from 𝕃_r
23:        n_u ← n(i_u), n_v ← n(i_v), n_u' ← n_u, n_v' ← n_v
24:        𝒰' ← {n_u : deg(n_u) = deg(n_u)} \ {n_u}
25:        𝒱' ← {n_v : deg(n_v) = deg(n_v)] \ {n_v}
26:        if |𝒰'| = 0 then
27:           n_v' ← uniform sample from {n_v' ∈ 𝒱' \ ne(n_u') : ne(n'_v) \ ne(n_v) ≠ ∅}
28:        else if |𝒱'| = 0 then
29:           n_u' ← uniform sample from {n_u' ∈ 𝒰' \ ne(n_v') : ne(n'_v) \ ne(n_v) ≠ ∅}
30:        else If 𝕃_n' := {(n_u', n_v') ∈ 𝒱' × 𝒰' : ne(n_v')) \ ne(n_v) ≠ ∅ and ne(n_u') \ ne(n_u) ≠ ∅} ≠ ∅
           then
31:           (n_u', n_v') ← uniform sample from 𝕃_n'
32:        else if 𝒱'' := {n_u' ∈ 𝒱' \ ne(n_u')} ≠ ∅ then
33:           n_v' ← uniform sample from 𝒱''
34:        else Boroojeni et al. (2017) proves that in this branch the set to draw samples is non-empty.
35:           n_u' ← uniform sample from {n_u' ∈ 𝒰' \ ne(n_v')}
36:        end if
37:        if n_u' = n_u then                          ▷ Case 2
38:           n_w' ← uniform sample from ne(n_v') \ ne(n_v)
39:           Remove edge (i(n_w'), i(n_v')) from 𝕃
40:           Add edges {(i(n_u), i(n_v')), (i(n_w'), i(n_v'))} to 𝕃
41:        else if n_u' = n_v then                     ▷ Case 2
42:           n_w ← uniform sample from ne(n_u') \ ne(n_u)
43:           Remove edge (i(n_u'), i(n_w)) from 𝕃
44:           Add edges {(i(n_u'), i(n_v)), (i(n_u), i(n_w))} to 𝕃
45:        else                                         ▷ Case 1
46:           n_w ← uniform sample from ne(n_u') \ ne(n_u)
47:           n_w' ← uniform sample from ne(n_v') \ ne(n_v)
48:           Remove edges {(i(n_u'), i(n_w)), (i(n_w'), i(n_v'))} from 𝕃
49:           Add edges {(i(n_u), i(n_w)), (i(n_w'), i(n_v')), (i(n_u'), i(n_v'))} to 𝕃
50:        end if
51:        𝕃_r ← repeated edges in 𝕃
52:     end while
53:     return L
```

Stage 2 (step 130)

In the second stage 130, a first set of attributes are generated for the first set of nodes based on the generated synthetic graph. In one embodiment, this involves modelling upper nodes U' conditioned on edges L'. This distribution essentially models a set of nodes given a particular topology, which can be implemented through a node embedding as:

$$p(U' \mid L') = \prod_{k=1}^{|U'|} p(n_u^i \mid \beta(L', i))$$

where $\beta$ is a node encoder that computes a node embedding of node i in graph L'. Its range is ran($\beta$)=$\mathbb{R}^{H_\beta}$, where $H_\beta$ is the dimension of the node embedding. Intuitively speaking, $\beta$ computes the representation of the local topology of node i in L'; if the representation is rich enough, $n_u^i$ and $n_u^j$ are conditional independent given the representation for any i, j. As such, once given $\beta$, this distribution can be modelled by any existing conditional generative model. A few for $\beta$ are:

Node statistics: d-step neighbour count (the number of neighbours with distance d for a chosen d). As a simple example, d=1 means using node degrees as 1d embeddings. This can be generalized to use a collection of counts with $H_\beta$ different d, giving an embedding of size $H_\beta$.

Node embedding: an embedding model can be fit to the data and used for $\beta$. Examples of potential embedding models include DeepWalk and node2vec. The model can be fit using stochastic gradient descent. In order to ensure privacy, differentially private stochastic gradient descent (DP-SGD) can be used.

Accordingly, the method for generating a first set of attributes can include:

1. For a pair of tables (A and B), extract the attribute of A and links between rows of A and B and represent the links as a bipartite graph
2. Compute a node embedding for each node in table A of the graph using any method that computes the node embedding, i.e. a method that takes in a graph and a node and outputs a fixed-size vector that represents the topology of the node in the graph. This gives the synthetic node representation. Optionally, this may be achieved in a differentially private manner to ensure privacy.
3. Conditioning on the synthetic node representation, sample the rows for Table A using a generative model that is configured to generate attributes conditioned on the synthetic node representation.

The generative model may fit to the attributes A (e.g. may be trained based on the attributes A) with the computed node representation as a condition. The conditional generative model may be a conditional differentially private (DP) generative model. The fitting may involve adjusting one or more parameters of the model to optimize an objective function. For instance, the objective function may aim to minimize an error (or difference) between the generated attributes A' and the attributes A. If this is implemented in a differentially private manner, then this optimization may include a condition for a minimum level of differential privacy.

Stage 3 (step 150)

In stage 3 the second attributes are generated based on the first attributes and the synthetic graph 150.

Consider a node $n_v \in V$ with neighbors $ne(n_v) \subseteq U$. It can be seen that, given $ne(n_v)$, $n_v$ is conditionally independent with any other $n'_v \in V$. Accordingly, it is possible to generate the attributes of the second nodes conditioned on the synthetic graph and first nodes based on the probability distribution:

$$p(V' \mid L', U') = \prod_{n_v \in V'} p(n_v \mid ne(n_v))$$

where $p(n_v | ne(n_v))$ is a conditional distribution whose condition is a multiset—a set that allows repeated elements. Without imposing any order on $ne(n_v)$, one method for conditions on this is through a fixed size set embedding computed by an aggregator $\gamma$. This leads to the following model:

$$p(V' \mid L', U') = \prod_{n_v \in V'} p(n_v \mid \gamma(ne(n_v)))$$

This model requires an aggregator: $\text{pow}(U') \to \mathbb{R}^{H_\gamma}$ where $\text{pow}(U')$ is the power set of $U'$ and $H_\gamma$ is the dimension of the set embedding. If the set embedding is rich enough, any two nodes $n_v$ and $n'_v$ are conditionally independent given the corresponding set embeddings. A few candidates for the aggregator are:

1. Summary statistics: a summary statistic (e.g. count, sum, n-th order moments, q-percent quantiles, etc.) can be used. For instance, q-percent quantiles are divisions of the set into subsets that fall within particular ranges (e.g. for a chosen q that spans [0, 1]e.g. (0.1, 0.3, 0.5, 0.7, 0.9)). If both count and sum are used and d different moments and quantiles are used, the total dimension of the embedding is D+D+d×D+d×D for nodes with D-dimensional attributes.
2. Distribution parameters: A distribution can be fit to the set and the distribution parameters can be used as the embedding. This may use a Gaussian copula. For instance, a Gaussian Copula model may be fit with the neighbours as the training set and the model parameters (e.g. marginals as histogram vectors and the covariance matrix) as the representation. In this case, for nodes with D-dimensional attributes, the dimension of the embedding is $D+D^2$.
3. Set embedding: A set embedding may be utilized (such as the Deep Sets architecture detailed in Zaheer et al. "Deep sets", *Advances in neural information processing systems*, 30, 2017, the entirety of which is incorporated herein by reference). For instance, two neural networks may be utilized, one to compute an embedding for each element in the set and one to aggregate the element embeddings into a set embedding. The set embedding may be trained (e.g. using stochastic gradient descent, and optionally, using differentially private stochastic gradient descent) based on the input data set. This is only valid if the generative model used to generate the attributes of B based on the set embedding is also neural network based.

Accordingly, the second set of attributes can be generated using the following method:

1. For a pair of tables (A and B), extract the attribute of B and links between rows of A and B and represent the links as a bipartite graph.
2. Compute a set embedding—a representation for the neighbours (e.g. parents) of each node in Table B in the graph using any method that computes a multiset representation, i.e. a method that takes in a multiset and outputs a fixed-size vector that represents the neighbours. This method may achieve this in a differentially private manner.
3. Conditioning on the set embedding, sample the rows for table B using a generative model configured to generate attributes.

Depending on the type of set embedding used, the set embedding may need to be learned (e.g. based on the attributes of B and the synthetic graph).

The generative model may be trained (fit) based on the attributes of B with the computed set embedding as the condition. The generative model may be trained to be differentially private.

The training may be implemented in a similar manner to the training of the generative model in Stage 2; however, based instead on the attributes of table B and the set embedding.

If both the set embedding and the conditional generative model utilize neural networks, both can be learned in an end-to-end fashion using the learning objective of the conditional generative model.

Differential Privacy

The models described herein can be trained to synthesize data that mirrors the distribution of the input data set whilst maintaining a given level of privacy. As discussed above, a level of differential privacy may be ensured.

Each sub model in $p_\theta$ (U', V', L')=$p_{\theta_1}(L')p_{\theta_2}(U'|L')p_{\theta_3}(V'|L', U')$ can be trained such that the learned parameters $\theta=(\theta_1, \theta_2, \theta_3)$ are differentially private (DP). Each set of parameters, $\theta_1, \theta_2, \theta_3$ may be learned to be ($\epsilon, \delta$)-DP based on corresponding privacy budgets $\epsilon_1, \epsilon_1$ and $\epsilon_3$ ($\epsilon_1+\epsilon_2+\epsilon_3=\epsilon$). These privacy budgets may be predefined (e.g. set by a user).

For $p_{\theta_1}$, $\theta_1$ is a BJDD matrix $P_J$. As per the definition of differential privacy given above, it is important to mask the presence or absence of a single node of either U' or V', which can be a stronger privacy notion than edge protection. To achieve this, a Laplace mechanism may be implemented to make $P_J$ $\epsilon$-DP. For each entry in the BJD J, Laplacian noise may be added. Specifically, after measuring the BJD matrix J from data graphs, noise can be added to each entry, wherein for the i-th row and j-th column entry of J the noise added is $$\text{Lap}\left(\frac{S_{ij}}{\epsilon_1}\right),$$

where Lap( ) is the Laplace operator and $S_{ij}=4 \max(d_i, d_j)$. After injecting noise into the BJD J, the BJDD matrix $P_J$ can be sampled from J.

For $p_{\theta_2}$, $\theta_2$ comprises the parameters underlying the generative model for generating the first set of attributes U'. Accordingly, in order to ensure differential privacy, a differentially private generative model can be chosen, that is trained using differentially private stochastic gradient descent.

For $p_{\theta_3}$, $\theta_3$ comprises the parameters for the set embedding model as well as that of the generative model for generating the second set of attributes V'. For the former, if the set embedding is pre-fixed (such as summary statistics, or a Gaussian copula) then there is no learnable parameter for the embedding model. If the set embedding is based on a neural network (e.g. the deep sets architecture), then it can be trained using differentially private stochastic gradient descent. A differentially private generative model can be chosen for the generative model, that is trained using differentially private stochastic gradient descent. If the set embedding is based on a neural network, both the generator model and the set embedding can be jointly trained using differentially private stochastic gradient descent.

Given the factorization implemented herein: $p_\theta(U', V', L') = p_{\theta_1}(L') p_{\theta_2}(U'|L') p_{\theta_3}(V'|L', U')$, by sequential composition it follows that if each of the submodels are differentially private according to $\epsilon_1$, $\epsilon_2$ and $\epsilon_3$ then the overall process is $(\epsilon_1 + \epsilon_2 + \epsilon_3)$-differentially private.

The proposed formulation is sufficiently flexible to allow privacy protection of the nodes from one of the generated tables U', V' but not the other. This can be implemented by setting $\epsilon$ for the generation of the particular table to be equal to infinity. For instance, if the first generated table U' is chosen to be protected, then $\epsilon_3$ may be set to $\epsilon_3 = \infty$ when learning $p_{\theta_3}$ and $d_j = 0$ can be chosen for all j when learning $p_{\theta_1}$, making the overall synthetic data generation process $(\epsilon, \delta)$-DP $(\epsilon_1 + \epsilon_2 = \epsilon)$.

In an example, the conditional models and/or the node embedding models are implemented using (artificial) neural networks. An artificial neural network is a structure inspired by the human brain. An example neural network comprises a plurality of node layers, including an input layer, an output layer and one or more middle layers. Each layer comprises a node (also referred to as a neuron or perceptron). A node is a computation unit having one or more weighted input connections, a transfer function that combines the inputs through a mathematical function to produce an output, and an output connection. Nodes of the different layers are connected to each other via weighted connections such that the output connection of one node is coupled to an input connection of another node. The neural network may be parameterized by a set of one or more parameters. Training a neural network may include updating parameters of the neural network to optimize a particular objective function. This might be in the form of stochastic gradient descent, in which parameters of the neural network are updated based on the gradient of a loss function. The loss function may be based, at least in part, on an error (a difference between an output of the neural network (a prediction) and a predefined value (a training value).

Whilst the above embodiments assume that there are no edge attributes, the methodology described herein can be expanded to take into account edge attributes (attributes associated with each association between entries). This can be achieved by adding an edge attribute model that is similar to p(L|U, V) but generates edge attributes instead. Any form of edge prediction model can be used for this purpose. Rather than predicting the existence of edges, the edge attribute model in this case generates edge attributes based on the generated attributes U' and V'. In this case, the edge attribute model can be implemented after all other data has been generated (e.g. after stage 3 discussed above). A neural network may be utilized to predict these edge attributes. The neural network may be trained to predict edge attributes based on training data including labelled edge attributes (e.g. through stochastic gradient descent). As with the other steps, this can be implemented in a differentially private manner (e.g. through DP-STG).

While the reader will appreciate that the general methods described herein are applicable to any computing system, a typical computing system will now be described, which provides means capable of putting an embodiment, as described herein, into effect.

Figure 4:
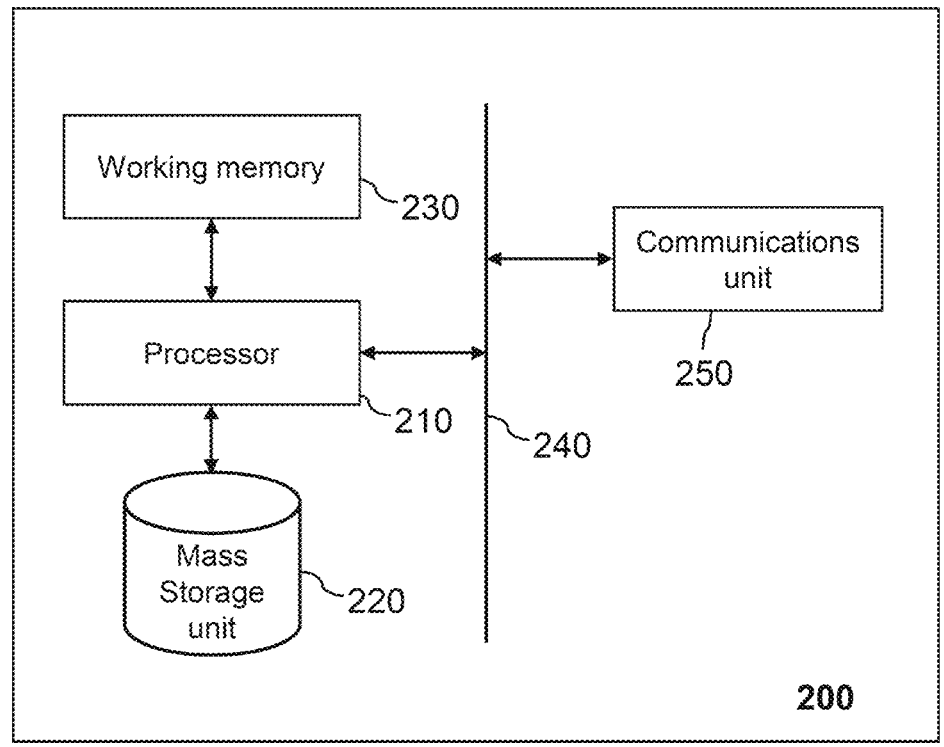
FIG. 4 shows a computing system for implementing embodiments described herein.

FIG. 4 shows a computing system for implementing embodiments described herein. As illustrated, the computing system 200 comprises a processor 210 coupled to a mass storage unit 220 and accessing a working memory 230.

Usual procedures for the loading of software into memory and the storage of data in the mass storage unit 220 apply. The processor 210 also accesses, via bus 240, a communications interface 250 that is configured to receive data from and output data to an external system (e.g. an external network or a user input or output device). The communications interface 250 may be a single component or may be divided into a separate input interface and a separate output interface.

The processor is configured to implement the methodology described herein based on executable software stored within the mass storage unit 220. The software can be embedded in original equipment, or can be provided, as a whole or in part, after manufacture. For instance, the software can be introduced, as a whole, as a computer program product, which may be in the form of a download, or to be introduced via a computer program storage medium, such as an optical disk or connectable memory drive (such as a Universal Serial Bus flash drive). Alternatively, modifications to an existing controller can be made by an update, or plug-in, to provide features of the above described embodiment.

The computing system 200 may implement the methodology described herein to generate synthetic data. This may make use of pre-trained models. Alternatively, the computing system 200 may train the models based on the input data set to generate synthetic data.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

What is claimed is:

1. A non-transitory computer-readable medium comprising computer-readable instructions stored thereon that when executed by a processor cause the processor to:
generate a synthetic graph from a first plurality of entries in a first table (Table A) and a second plurality of entries in a second table (Table B), wherein the synthetic graph comprises a first set of nodes (U'), a second set of nodes (V') and a first set of edges (L'), wherein the first table (Table A) and the second table (Table B) form a first data set corresponding to real data, wherein the first plurality of entries in the first table (Table A) and the second plurality of entries in the second table (Table B) have a many-to-many relationship, and wherein generating the synthetic graph comprises generating a graph topology only for the first set of nodes (U') and the second set of nodes (V');
determine one or more first attributes associated with each node in the first set of nodes (U') using a first conditional model (p(U'|L')) conditioned on the synthetic graph by:
obtaining the first conditional model ((p(U|L));
determining a node embedding for each node in the first set of nodes (U') based on a node embedding model (β) and the synthetic graph;
determining a probability distribution of each attribute associated with a node in the first set of nodes (U') using the first conditional model ((p(U|L))) and the node embedding associated with the node; and
sampling from the probability distribution to obtain each attribute of the one or more first attributes associated with the node; and
determine one or more second attributes associated with each node in the second set of nodes (V') using a second conditional model (p(V'|L', U')) conditioned on the synthetic graph and on the one or more first attributes associated with each node in the first set of nodes (U');
wherein the one or more first attributes associated with each node in the first set of nodes (U') correspond to a third plurality of entries in a third table (Table A');
wherein the one or more second attributes associated with each node in the second set of nodes (V') correspond to a fourth plurality of entries in a fourth table (Table B');
wherein the third table (Table A') and the fourth table (Table B') comprise synthetic data generated from the real data; and
wherein the third plurality of entries in the third table (Table A') and the fourth plurality of entries in the fourth table (Table B') have the many-to-many relationship as the first plurality of entries in the first table (Table A) and the second plurality of entries in the second table (Table B) while protecting privacy of information within the first plurality of entries in the first table (Table A) and the second plurality of entries in the second table (Table B).

2. The non-transitory computer-readable medium of claim 1, wherein to generate the synthetic graph, the computer-readable instructions further cause the processor to:
represent associations between the first plurality of entries in the first table (Table A) and the second plurality of entries in the second table (Table B) as a bipartite graph (B);
calculate a bipartite joint degree distribution ($P_J$) of the bipartite graph (B);
inject additive noise to the bipartite joint degree distribution ($P_J$) to generate a modified bipartite joint degree distribution ($P_J$+noise) for protecting the privacy of the information;
sample a target number of edges from the modified bipartite joint degree distribution ($P_J$+noise) to generate a joint degree matrix; and
generate the synthetic graph that complies with the joint degree matrix by at least one of removing loop edges or removing multiple edges whilst maintaining a joint degree distribution that complies with the joint degree matrix for the synthetic data.

3. The non-transitory computer-readable medium of claim 2, wherein the bipartite joint degree distribution ($P_J$) is a matrix and wherein to inject the additive noise to the bipartite joint degree distribution ($P_J$), the computer-readable instructions further cause the processor to:
calculate a noise value for an entry in the matrix using a Laplace mechanism to ensure ε-differential privacy, where ε is a first parameter associated with an amount of differential privacy (ε), wherein the noise value is calculated according to:

$$\text{Lap}\left(\frac{S_{ij}}{\varepsilon}\right),$$

where $S_{ij}=4\max(d_i, d_j)$, where i is a row of the entry in the matrix, j is a column of the entry in the matrix, ($d_i$, $d_j$) is a position of the entry in the matrix and Lap is the Laplace mechanism; and
add the noise value to the entry.

4. The non-transitory computer-readable medium of claim 1, wherein to obtain the first conditional model (p(U|L)), the computer-readable instructions further cause the processor to:
extract a first set of attributes from the first table (Table A);
represent associations between the first plurality of entries in the first table (Table A) and the second plurality of entries in the second table (Table B) as a bipartite graph (B), wherein the bipartite graph comprises a third set of nodes (U) associated with the first set of attributes and a second set of edges (L);
determine a set of node embeddings comprising a node embedding for each node in the third set of nodes; and
generate the first conditional model (p(U|L)) based on the first set of attributes and the set of node embeddings by fitting the first conditional model (p(U|L)) on the first set of attributes with the set of node embeddings as a condition.

5. The non-transitory computer-readable medium of claim 1, wherein to determine the one or more second attributes associated with each node in the second set of nodes (V') using the second conditional model (p(V|L, U)) conditioned on the synthetic graph and the one or more first attributes associated with each node in the first set of nodes (U'), the computer-readable instructions further cause the processor to:

obtain a second node embedding model ($\gamma$);

determine a node embedding for each node in the second set of nodes (V') based on the node embedding model ($\gamma$) and information associated with neighbors (ne($n_v$)) of each node in the second set of nodes (V'), wherein the information associated with the neighbors (ne($n_v$)) of each node in the second set of nodes (V') comprises the one or more first attributes associated with each node in the first set of nodes (U') that are associated with the neighbors (ne($n_v$)) of each respective node in the second set of nodes (V'), and wherein the node embedding for each node in the second set of nodes (V') is a fixed size vector;

determine a probability distribution of each attribute associated with a node in the second set of nodes (V') using the second conditional model (p(V|L,U)) and the node embedding associated with the node; and sample from the probability distribution to obtain each attribute of the one or more second attributes associated with the node.

6. The non-transitory computer-readable medium of claim 5, wherein to obtain the second conditional model (p(V|L, U)), the computer-readable instructions further cause the processor to:

extract a second set of attributes from the second table (Table B);

represent associations between entries in the first table (Table A) and entries in the second table (Table B) as a bipartite graph (B), wherein the bipartite graph comprises a third set of nodes (V) associated with the second set of attributes;

determine a set of node embeddings comprising a second node embedding for each node in the third set of nodes (V), wherein the second node embedding for each node in the third set of nodes (V) represents attributes of neighbors of each node in the third set of nodes (V); and generate the second conditional model (p(V|L, U)) based on the second set of attributes and the set of node embeddings by fitting the second conditional model on the second set of attributes with the set of node embeddings as a condition.

7. The non-transitory computer-readable medium of claim 6, wherein to determine the set of node embeddings, the computer-readable instructions further cause the processor to:

determine a multiset representation for each node in the third set of nodes (V) based on the attributes of the neighbors of each respective node in the third set of nodes (V); and calculate the set of node embeddings based on the multiset representation for each node.

8. The non-transitory computer-readable medium of claim 1, wherein the first conditional model (p(U|L)) and the second conditional model (p(V|L, U)) are each Differentially Private (DP) conditional models.

9. The non-transitory computer-readable medium of claim 1, wherein the computer-readable instructions further cause the processor to:

determine a value of the first learnable parameter ($\theta_1$) to generate the synthetic graph;

learn a value of a second learnable parameter ($\theta_2$) such that the first conditional model (p(U|L)) satisfies a first criteria, wherein the second learnable parameter ($\theta_2$) comprises parameters of the first conditional model (p(U|L)), and wherein the first criteria is that an error between an output of the first conditional model p (U |L) and a node value associated with the first data set is minimized subject to a differential privacy criteria; and learn a value of a third learnable parameter ($\theta_3$) such that the second conditional model (p(V|L, U)) satisfies a second criteria, wherein the second learnable parameter ($\theta_3$) comprises parameters of the second conditional model (p(V|L, U)), and wherein the second criteria is that an error between an output of the second conditional model (p(V|L, U)) and a node value associated with the first data set is minimized subject to the differential privacy criteria.

10. A non-transitory computer-readable medium comprising computer-readable instructions stored thereon that when executed by a processor cause the processor to:

generate a synthetic graph from a first plurality of entries in a first table (Table A) and a second plurality of entries in a second table (Table B), wherein the synthetic graph comprises a first set of nodes (U'), a second set of nodes (V') and a first set of edges (L'), wherein the first table (Table A) and the second table (Table B) form a first data set corresponding to real data. wherein the first plurality of entries in the first table (Table A) and the second plurality of entries in the second table (Table B) have a many-to-many relationship, wherein generating the synthetic graph comprises generating a graph topology only for the first set of nodes (U') and the second set of nodes (V'), and wherein to generate the synthetic graph, the computer-readable instructions further cause the processor to:

represent associations between the first plurality of entries in the first table (Table A) and the second plurality of entries in the second table (Table B) as a bipartite graph (B);

calculate a bipartite joint degree distribution ($P_J$) of the bipartite graph (B);

inject additive noise to the bipartite joint degree distribution ($P_J$) to generate a modified bipartite joint degree distribution ($P_J$+noise) for protecting the privacy of the information;

sample a target number of edges from the modified bipartite joint degree distribution ($P_J$+noise) to generate a joint degree matrix; and generate the synthetic graph that complies with the joint degree matrix by removing loop edges and/or removing multiple edges whilst maintaining a joint degree distribution that complies with the joint degree matrix for the synthetic data;

determine one or more first attributes associated with each node in the first set of nodes (U') using a first conditional model (p(U'|L')) conditioned on the synthetic graph; and determine one or more second attributes associated with each node in the second set of nodes (V') using a second conditional model (p(V'|L', U')) conditioned on the synthetic graph and on the one or more first attributes associated with each node in the first set of nodes (U');

wherein the one or more first attributes associated with each node in the first set of nodes (U') correspond to a third plurality of entries in a third table (Table A');

wherein the one or more second attributes associated with each node in the second set of nodes (V') correspond to a fourth plurality of entries in a fourth table (Table B');

wherein the third table (Table A') and the fourth table (Table B') comprise synthetic data generated from the real data; and wherein the third plurality of entries in the third table (Table A') and the fourth plurality of entries in the fourth table (Table B') have the many-to-many relationship as the first plurality of entries in the first table (Table A) and the second plurality of entries in the second table (Table B) while protecting privacy of information within the first plurality of entries in the first table (Table A) and the second plurality of entries in the second table (Table B).

11. The non-transitory computer-readable medium of claim 10, wherein the bipartite joint degree distribution ($P_J$) is a matrix and wherein to inject the additive noise to the bipartite joint degree distribution ($P_J$), the computer-readable instructions further cause the processor to:

calculate a noise value for an entry in the matrix using a Laplace mechanism to ensure ε-differential privacy, where ε is a first parameter associated with an amount of differential privacy (ε), wherein the noise value is calculated according to:

$$\text{Lap}\left(\frac{S_{ij}}{\varepsilon}\right),$$

where $S_{ij}$=4max($d_i$, $d_j$), where i is a row of the entry in the matrix, j is a column of the entry in the matrix, ($d_i$, $d_j$) is a position of the entry in the matrix and Lap is the Laplace mechanism; and add the noise value to the entry.

12. The non-transitory computer-readable medium of claim 10, wherein to determine the one or more second attributes associated with each node in the second set of nodes (V') using the second conditional model (p(V|L, U)) conditioned on the synthetic graph and the one or more first attributes associated with each node in the first set of nodes (U'), the computer-readable instructions further cause the processor to:

obtain a second node embedding model (γ);

determine a node embedding for each node in the second set of nodes (V') based on the node embedding model (γ) and information associated with neighbors (ne($n_v$)) of each node in the second set of nodes (V'), wherein the information associated with the neighbors (ne($n_v$)) of each node in the second set of nodes (V') comprises the one or more first attributes associated with each node in the first set of nodes (U') that are associated with the neighbors (ne($n_v$)) of each respective node in the second set of nodes (V'), and wherein the node embedding for each node in the second set of nodes (V') is a fixed size vector;

determine a probability distribution of each attribute associated with a node in the second set of nodes (V') using the second conditional model (p(V|L,U)) and the node embedding associated with the node; and sample from the probability distribution to obtain each attribute of the one or more second attributes associated with the node.

13. The non-transitory computer-readable medium of claim 12, wherein to obtain the second conditional model (p(V|L, U)), the computer-readable instructions further cause the processor to:

extract a second set of attributes from the second table (Table B);

represent associations between entries in the first table (Table A) and entries in the second table (Table B) as a bipartite graph (B), wherein the bipartite graph comprises a third set of nodes (V) associated with the second set of attributes;

determine a set of node embeddings comprising a second node embedding for each node in the third set of nodes (V), wherein the second node embedding for each node in the third set of nodes (V) represents attributes of neighbors of each node in the third set of nodes (V) and are determined by:

determining a multiset representation for each node in the third set of nodes (V) based on the attributes of the neighbors of each respective node in the third set of nodes (V); and calculating the set of node embeddings based on the multiset representation for each node; and generate the second conditional model (p(V|L, U)) based on the second set of attributes and the set of node embeddings by fitting the second conditional model on the second set of attributes with the set of node embeddings as a condition.

14. The non-transitory computer-readable medium of claim 10, wherein to obtain the first conditional model (p(U|L)), the computer-readable instructions further cause the processor to:

extract a first set of attributes from the first table (Table A);

represent associations between the first plurality of entries in the first table (Table A) and the second plurality of entries in the second table (Table B) as a bipartite graph (B), wherein the bipartite graph comprises a third set of nodes (U) associated with the first set of attributes and a second set of edges (L);

determine a set of node embeddings comprising a node embedding for each node in the third set of nodes; and generate the first conditional model (p(U|L)) based on the first set of attributes and the set of node embeddings by fitting the first conditional model (p(U|L)) on the first set of attributes with the set of node embeddings as a condition.

15. The non-transitory computer-readable medium of claim 10, wherein the first conditional model (p(U|L)) and the second conditional model (p(V|L, U)) are each Differentially Private (DP) conditional models.

16. The non-transitory computer-readable medium of claim 10, wherein the computer-readable instructions further cause the processor to:

determine a value of the first learnable parameter ($θ_1$);

learn a value of a second learnable parameter (02), such that the first conditional model (p(U|L)) satisfies a criteria, wherein the second learnable parameter ($θ_2$) comprises parameters of the first conditional model (p(U|L)); and wherein the criteria is that an error between an output of the first conditional model p(U|L) and a node value associated with the first data set is minimized subject to a differential privacy criteria; and learn a value of a third learnable parameter ($θ_3$), such that the second conditional model (p(V|L, U)) satisfies a criteria, wherein the second learnable parameter ($θ_3$) comprises parameters of the second conditional model (p(V|L, U)); and the criteria is that an error between an output of the second conditional model (p(V|L, U)) and a node value associated with the first data set is minimized subject to the differential privacy criteria.

17. A system comprising:
a memory having computer-readable instructions stored thereon; and
a processor that executes the computer-readable instructions to:
generate a synthetic graph from a first plurality of entries in a first table (Table A) and a second plurality of entries in a second table (Table B), wherein the synthetic graph comprises a first set of nodes (U'), a second set of nodes (V'), and a first set of edges (L'), wherein the first table (Table A) and the second table (Table B) form a first data set corresponding to real data, wherein the first plurality of entries in the first table (Table A) and the second plurality of entries in the second table (Table B) have a many-to-many relationship, and wherein generating the synthetic graph comprises generating a graph topology only for the first set of nodes (U') and the second set of nodes (V');
determine one or more first attributes associated with each node in the first set of nodes (U') using a first conditional model (p(U'|L')) conditioned on the synthetic graph by:
obtaining the first conditional model ((p(U|L));
determining a node embedding for each node in the first set of nodes (U') based on a node embedding model (β) and the synthetic graph;
determining a probability distribution of each attribute associated with a node in the first set of nodes (U') using the first conditional model ((p(U|L))) and the node embedding associated with the node; and
sampling from the probability distribution to obtain each attribute of the one or more first attributes associated with the node; and
determine one or more second attributes associated with each node in the second set of nodes (V') using a second conditional model (p(V'|L', U')) conditioned on the synthetic graph and on the one or more first attributes associated with each node in the first set of nodes (U'),
wherein the one or more first attributes associated with each node in the first set of nodes (U') correspond to a third plurality of entries in a third table (Table A');
wherein the one or more second attributes associated with each node in the second set of nodes (V') correspond to a fourth plurality of entries in a fourth table (Table B');
wherein the third table (Table A') and the fourth table (Table B') comprise synthetic data generated from the real data; and
wherein the third plurality of entries in the third table (Table A') and the fourth plurality of entries in the fourth table (Table B') have the many-to-many relationship as the first plurality of entries in the first table (Table A) and the second plurality of entries in the second table (Table B) while protecting privacy of information within the first plurality of entries in the first table (Table A) and the second plurality of entries in the second table (Table B).

18. The system of claim 17, wherein to generate the synthetic graph, the computer-readable instructions further cause the processor to:
represent associations between the first plurality of entries in the first table (Table A) and the second plurality of entries in the second table (Table B) as a bipartite graph (B);
calculate a bipartite joint degree distribution ($P_J$) of the bipartite graph (B);
inject additive noise to the bipartite joint degree distribution ($P_J$) to generate a modified bipartite joint degree distribution ($P_J$+noise);
sample a target number of edges from the modified bipartite joint degree distribution ($P_J$+noise) to generate a joint degree matrix; and
generate the synthetic graph that complies with the joint degree matrix by at least one of removing loop edges or removing multiple edges whilst maintaining a joint degree distribution that complies with the joint degree matrix for the synthetic data.

19. The system of claim 18, wherein the bipartite joint degree distribution ($P_J$) is a matrix and wherein to inject the additive noise to the bipartite joint degree distribution ($P_J$), the computer-readable instructions further cause the processor to:
calculate a noise value for an entry in the matrix using a Laplace mechanism to ensure ε-differential privacy, where ε is a first parameter associated with an amount of differential privacy (ε), wherein the noise value is calculated according to:

$$\text{Lap}\left(\frac{S_{ij}}{\varepsilon}\right),$$

where $S_{ij}$=4max ($d_i$, $d_j$), where i is a row of the entry in the matrix, j is a column of the entry in the matrix, ($d_i$, $d_j$) is a position of the entry in the matrix and Lap is the Laplace mechanism; and
add the noise value to the entry.

20. The system of claim 17, wherein to determine the one or more second attributes associated with each node in the second set of nodes (V') using a second conditional model (p(V|L, U)) conditioned on the synthetic graph and the one or more attributes associated with each node in the first set of nodes (U'), the computer-readable instructions further cause the processor to:
obtain a second node embedding model (γ);
determine a node embedding for each node in the second set of nodes (V') based on the node embedding model (γ) and information associated with neighbors (ne($n_v$)) of each node in the second set of nodes (V'), wherein the information associated with the neighbors (ne($n_v$)) of each node in the second set of nodes (V') comprises the one or more first attributes associated with each node in the first set of nodes (U') that are associated with the neighbors (ne($n_v$)) of each respective node in the second set of nodes (V'), and wherein the node embedding for each node in the second set of nodes (V') is a fixed size vector;
determine a probability distribution of each attribute associated with a node in the second set of nodes (V') using the second conditional model (p(V|L, U)) and the node embedding associated with the node; and
sample from the probability distribution to obtain each attribute of the one or more second attributes associated with the node.

21. A non-transitory computer-readable medium comprising computer-readable instructions stored thereon that when executed by a processor cause the processor to:
generate a synthetic graph from a first plurality of entries in a first table (Table A) and a second plurality of entries in a second table (Table B), wherein the synthetic graph comprises a first set of nodes (U'), a second set of nodes (V') and a first set of edges (L'), wherein the first table (Table A) and the second table (Table B) form a first data set corresponding to real data, wherein the first plurality of entries in the first table (Table A) and the second plurality of entries in the second table (Table B) have a many-to-many relationship, wherein generating the synthetic graph comprises generating a graph topology only for the first set of nodes (U') and the second set of nodes (V');

determine one or more first attributes associated with each node in the first set of nodes (U') using a first conditional model (p(U'|L')) conditioned on the synthetic graph; and determine one or more second attributes associated with each node in the second set of nodes (V') using a second conditional model (p(V'|L', U')) conditioned on the synthetic graph and on the one or more first attributes associated with each node in the first set of nodes (U'); wherein the one or more first attributes associated with each node in the first set of nodes (U') correspond to a third plurality of entries in a third table (Table A'), wherein to determine the one or more second attributes, the computer-readable instructions further cause the processor to:

obtain a second node embedding model ($\gamma$);

determine a node embedding for each node in the second set of nodes (V') based on the node embedding model ($\gamma$) and information associated with neighbors (ne($n_v$)) of each node in the second set of nodes (V'), wherein the information associated with the neighbors (ne($n_v$)) of each node in the second set of nodes (V') comprises the one or more first attributes associated with each node in the first set of nodes (U') that are associated with the neighbors (ne($n_v$)) of each respective node in the second set of nodes (V'), and wherein the node embedding for each node in the second set of nodes (V') is a fixed size vector;

determine a probability distribution of each attribute associated with a node in the second set of nodes (V') using the second conditional model (p(V|L, U)) and the node embedding associated with the node; and sample from the probability distribution to obtain each attribute of the one or more second attributes associated with the node;

wherein the one or more second attributes associated with each node in the second set of nodes (V') correspond to a fourth plurality of entries in a fourth table (Table B');

wherein the third table (Table A') and the fourth table (Table B') comprise synthetic data generated from the real data; and wherein the third plurality of entries in the third table (Table A') and the fourth plurality of entries in the fourth table (Table B') have the many-to-many relationship as the first plurality of entries in the first table (Table A) and the second plurality of entries in the second table (Table B) while protecting privacy of information within the first plurality of entries in the first table (Table A) and the second plurality of entries in the second table (Table B).

22. The non-transitory computer-readable medium of claim 21, wherein the computer-readable instructions further cause the processor to:

determine a value of the first learnable parameter ($\theta_1$);

learn a value of a second learnable parameter ($\theta_2$), such that the first conditional model (p(U|L)) satisfies a criteria, wherein the second learnable parameter ($\theta_2$) comprises parameters of the first conditional model (p(U|L)); and wherein the criteria is that an error between an output of the first conditional model p (U|L) and a node value associated with the first data set is minimized subject to a differential privacy criteria; and learn a value of a third learnable parameter ($\theta_3$), such that the second conditional model (p(V|L, U)) satisfies a criteria, wherein the second learnable parameter ($\theta_3$) comprises parameters of the second conditional model (p(V|L, U)); and the criteria is that an error between an output of the second conditional model (p (V|L, U)) and a node value associated with the first data set is minimized subject to the differential privacy criteria.

23. The non-transitory computer-readable medium of claim 21, wherein:

to obtain the second conditional model (p(V|L, U)), the computer-readable instructions further cause the processor to:

extract a second set of attributes from the second table (Table B);

represent associations between entries in the first table (Table A) and entries in the second table (Table B) as a bipartite graph (B), wherein the bipartite graph comprises a third set of nodes (V) associated with the second set of attributes;

determine a set of node embeddings comprising a second node embedding for each node in the third set of nodes (V), wherein the second node embedding for each node in the third set of nodes (V) represents attributes of neighbors of each node in the third set of nodes (V) and are determined by:

determining a multiset representation for each node in the third set of nodes (V) based on the attributes of the neighbors of each respective node in the third set of nodes (V); and calculating the set of node embeddings based on the multiset representation for each node; and generate the second conditional model (p(V|L, U)) based on the second set of attributes and the set of node embeddings by fitting the second conditional model on the second set of attributes with the set of node embeddings as a condition, and to obtain the first conditional model (p(U|L)), the computer-readable instructions further cause the processor to:

extract a first set of attributes from the first table (Table A);

represent associations between the first plurality of entries in the first table (Table A) and the second plurality of entries in the second table (Table B) as a bipartite graph (B), wherein the bipartite graph comprises a third set of nodes (U) associated with the first set of attributes and a second set of edges (L);

determine a set of node embeddings comprising a node embedding for each node in the third set of nodes; and generate the first conditional model (p(U|L)) based on the first set of attributes and the set of node embeddings by fitting the first conditional model (p(U|L)) on the first set of attributes with the set of node embeddings as a condition.

24. A method comprising:

generating, by a processor executing computer-readable instructions stored on a memory, a synthetic graph from a first plurality of entries in a first table (Table A) and a second plurality of entries in a second table (Table B), wherein the synthetic graph comprises a first set of nodes (U'), a second set of nodes (V'), and a first set of edges (L'), wherein the first table (Table A) and the second table (Table B) form a first data set corresponding to real data, wherein the first plurality of entries in the first table (Table A) and the second plurality of entries in the second table (Table B) have a many-to-many relationship, and wherein generating the synthetic graph comprises generating a graph topology only for the first set of nodes (U') and the second set of nodes (V');

determining, by the processor, one or more first attributes associated with each node in the first set of nodes (U') using a first conditional model (p(U'|L')) conditioned on the synthetic graph by:

obtaining, by the processor, the first conditional model ((p(U|L));

determining, by the processor, a node embedding for each node in the first set of nodes (U') based on a node embedding model (β) and the synthetic graph;

determining, by the processor, a probability distribution of each attribute associated with a node in the first set of nodes (U') using the first conditional model ((p(U|L))) and the node embedding associated with the node; and sampling, by the processor, from the probability distribution to obtain each attribute of the one or more first attributes associated with the node; and determining, by the processor, one or more second attributes associated with each node in the second set of nodes (V') using a second conditional model (p(V'|L', U')) conditioned on the synthetic graph and on the one or more first attributes associated with each node in the first set of nodes (U'), wherein the one or more first attributes associated with each node in the first set of nodes (U') correspond to a third plurality of entries in a third table (Table A');

wherein the one or more second attributes associated with each node in the second set of nodes (V') correspond to a fourth plurality of entries in a fourth table (Table B');

wherein the third table (Table A') and the fourth table (Table B') comprise synthetic data generated from the real data; and wherein the third plurality of entries in the third table (Table A') and the fourth plurality of entries in the fourth table (Table B') have the many-to-many relationship as the first plurality of entries in the first table (Table A) and the second plurality of entries in the second table (Table B) while protecting privacy of information within the first plurality of entries in the first table (Table A) and the second plurality of entries in the second table (Table B).

25. The method of claim 24, wherein to generate the synthetic graph, the method further comprises:

representing, by the processor, associations between the first plurality of entries in the first table (Table A) and the second plurality of entries in the second table (Table B) as a bipartite graph (B);

calculating, by the processor, a bipartite joint degree distribution ($P_J$) of the bipartite graph (B);

injecting, by the processor, additive noise to the bipartite joint degree distribution ($P_J$) for generating a modified bipartite joint degree distribution ($P_J$+noise);

sampling, by the processor, a target number of edges from the modified bipartite joint degree distribution ($P_J$+noise) for generating a joint degree matrix; and generating, by the processor, the synthetic graph that complies with the joint degree matrix by at least one of removing loop edges or removing multiple edges whilst maintaining a joint degree distribution that complies with the joint degree matrix for the synthetic data.

26. The method of claim 25, wherein the bipartite joint degree distribution ($P_J$) is a matrix and wherein to inject the additive noise to the bipartite joint degree distribution ($P_J$), the method further comprises:

calculating, by the processor, a noise value for an entry in the matrix using a Laplace mechanism to ensure-differential privacy, where ε is a first parameter associated with an amount of differential privacy (ε), wherein the noise value is calculated according to:

$$\mathrm{Lap}\!\left(\frac{S_{ij}}{\varepsilon}\right)\!,$$

where $S_{ij}=4\max(d_i, d_j)$, where i is a row of the entry in the matrix, j is a column of the entry in the matrix, ($d_i$, $d_j$) is a position of the entry in the matrix and Lap is the Laplace mechanism; and adding, by the processor, the noise value to the entry.

27. The method of claim 24, wherein to determine the one or more second attributes associated with each node in the second set of nodes (V') using a second conditional model (p(V|L, U)) conditioned on the synthetic graph and the one or more attributes associated with each node in the first set of nodes (U'), the method further comprises:

obtaining, by the processor, a second node embedding model (γ);

determining, by the processor, a node embedding for each node in the second set of nodes (V') based on the node embedding model (γ) and information associated with neighbors ($ne(n_v)$) of each node in the second set of nodes (V'), wherein the information associated with the neighbors ($ne(n_v)$) of each node in the second set of nodes (V') comprises the one or more first attributes associated with each node in the first set of nodes (U') that are associated with the neighbors ($ne(n_v)$) of each respective node in the second set of nodes (V'), and wherein the second node embedding for each node in the second set of nodes (V') is a fixed size vector;

determining, by the processor, a probability distribution of each attribute associated with a node in the second set of nodes (V') using the second conditional model (p(V|L, U)) and the node embedding associated with the node; and sampling, by the processor, from the probability distribution to obtain each attribute of the one or more second attributes associated with the node.

28. A non-transitory computer-readable medium comprising computer-readable instructions stored thereon that when executed by a processor cause the processor to:

generate a synthetic graph from a first plurality of entries in a first table (Table A) and a second plurality of entries in a second table (Table B), wherein the synthetic graph comprises a first set of nodes (U'), a second set of nodes (V') and a first set of edges (L'), wherein the first table (Table A) and the second table (Table B) form a first data set corresponding to real data, wherein the first plurality of entries in the first table (Table A) and the second plurality of entries in the second table (Table B) have a many-to-many relationship, wherein generating the synthetic graph comprising generating a graph topology only for the first set of nodes (U') and the second set of nodes (V'); and wherein a value of the first learnable parameter ($\theta_1$) is determined to generate the synthetic graph;

determine one or more first attributes associated with each node in the first set of nodes (U') using a first conditional model (p(U'|L')) conditioned on the synthetic graph, wherein a value of a second learnable parameter ($\theta_2$) is learned such that the first conditional model (p(U|L)) satisfies a first criteria, wherein the second learnable parameter ($\theta_2$) comprises parameters of the first conditional model (p(U|L)); and wherein the first criteria is that an error between an output of the first conditional model p(U|L) and a node value associated with the first data set is minimized subject to a differential privacy criteria; and determine one or more second attributes associated with each node in the second set of nodes (V') using a second conditional model (p(V'|L', U')) conditioned on the synthetic graph and on the one or more first attributes associated with each node in the first set of nodes (U');

wherein the one or more first attributes associated with each node in the first set of nodes (U') correspond to a third plurality of entries in a third table (Table A'), wherein a value of a third learnable parameter ($\theta_3$) is learned such that the second conditional model (p(V|L, U)) satisfies a second criteria, wherein the second learnable parameter ($\theta_3$) comprises parameters of the second conditional model (p(V|L, U)), and wherein the second criteria is that an error between an output of the second conditional model (p(V|L, U)) and a node value associated with the first data set is minimized subject to the differential privacy criteria;

wherein the one or more second attributes associated with each node in the second set of nodes (V') correspond to a fourth plurality of entries in a fourth table (Table B');

wherein the third table (Table A') and the fourth table (Table B') comprise synthetic data generated from the real data; and wherein the third plurality of entries in the third table (Table A') and the fourth plurality of entries in the fourth table (Table B') have the many-to-many relationship as the first plurality of entries in the first table (Table A) and the second plurality of entries in the second table (Table B) while protecting privacy of information within the first plurality of entries in the first table (Table A) and the second plurality of entries in the second table (Table B).

29. The non-transitory computer-readable medium of claim 28, wherein:

to obtain the second conditional model (p(V|L, U)), the computer-readable instructions further cause the processor to:

extract a second set of attributes from the second table (Table B);

represent associations between entries in the first table (Table A) and entries in the second table (Table B) as a bipartite graph (B), wherein the bipartite graph comprises a third set of nodes (V) associated with the second set of attributes;

determine a set of node embeddings comprising a second node embedding for each node in the third set of nodes (V), wherein the second node embedding for each node in the third set of nodes (V) represents attributes of neighbors of each node in the third set of nodes (V) and are determined by:

determining a multiset representation for each node in the third set of nodes (V) based on the attributes of the neighbors of each respective node in the third set of nodes (V); and calculating the set of node embeddings based on the multiset representation for each node; and generate the second conditional model (p(V|L, U)) based on the second set of attributes and the set of node embeddings by fitting the second conditional model on the second set of attributes with the set of node embeddings as a condition, and to obtain the first conditional model (p(U|L)), the computer-readable instructions further cause the processor to:

extract a first set of attributes from the first table (Table A);

represent associations between the first plurality of entries in the first table (Table A) and the second plurality of entries in the second table (Table B) as a bipartite graph (B), wherein the bipartite graph comprises a third set of nodes (U) associated with the first set of attributes and a second set of edges (L);

determine a set of node embeddings comprising a node embedding for each node in the third set of nodes; and generate the first conditional model (p(U|L)) based on the first set of attributes and the set of node embeddings by fitting the first conditional model (p(U|L)) on the first set of attributes with the set of node embeddings as a condition.

30. The non-transitory computer-readable medium of claim 28, wherein the first conditional model (p(U|L)) and the second conditional model (p(V|L, U)) are each Differentially Private (DP) conditional models.

* * * * *